(12) United States Patent
Huang (10) Patent No.: US 12,296,670 B2
(45) Date of Patent: May 13, 2025

(54) DRIVING ASSEMBLY AND VEHICLE HAVING SAME

(71) Applicant: SEGWAY TECHNOLOGY CO., LTD., Changzhou (CN)

(72) Inventor: Bowen Huang, Changzhou (CN)

(73) Assignee: Segway Technology Co., Ltd., Jiangsu (CN)

( * ) Notice: Subject to any disclaimer, the term of this patent is extended or adjusted under 35 U.S.C. 154(b) by 429 days.

(21) Appl. No.: 17/731,388

(22) Filed: Apr. 28, 2022

(65) Prior Publication Data

US 2022/0348076 A1  Nov. 3, 2022

(30) Foreign Application Priority Data

Apr. 30, 2021 (CN) .......................... 202120943256.1

(51) Int. Cl.
*B60K 17/344* (2006.01)
*B60K 1/00* (2006.01)
(Continued)

(52) U.S. Cl.
CPC .............. *B60K 17/344* (2013.01); *B60K 1/00* (2013.01); *F16H 1/222* (2013.01); *F16H 57/038* (2013.01);
(Continued)

(58) Field of Classification Search
CPC .... B60K 17/344; B60K 17/22; B60K 17/356; B60K 1/00; F16H 1/222; F16H 1/203;
(Continued)

(56) References Cited

U.S. PATENT DOCUMENTS 3,497,274 A * 2/1970 Yardley .................. F16C 23/08
384/583
3,937,096 A * 2/1976 Lundin ..................... F16D 1/10
74/421 A
(Continued)

FOREIGN PATENT DOCUMENTS

CN  201342939 Y  * 11/2009
CN  105507896 A  *  4/2016
(Continued)

OTHER PUBLICATIONS

Hofstetter, M., Lechleitner, D., Hirz, M et al. Multi-objective gearbox design optimization for xEV-axle drives under consideration of package restrictions. Forsch Ingenieurwes 82, 361-370 (2018). https://doi.org/10.1007/s10010-018-0278-9 (Year: 2018).*

*Primary Examiner* — Steve Clemmons
(74) *Attorney, Agent, or Firm* — Harter Secrest & Emery LLP; Timothy W. Menasco, Esq.

(57) ABSTRACT

A driving assembly includes a driving motor with a motor shaft, a transmission, first and second intermediate shafts, a power input shaft, a first output shaft and a second output shaft. The transmission includes a casing coupled to a housing of the driving motor, the power input shaft includes a power input end coupled to the driving motor, and power is transmitted between the first output shaft and the power input shaft and between the second output shaft and the power input shaft. The first and second intermediate shafts sequentially transmit power, power is transmitted between the first intermediate shaft and the power input shaft, and the second intermediate shaft simultaneously transmits power to the first output shaft and the second output shaft.

19 Claims, 7 Drawing Sheets

(51) Int. Cl.
  *F16H 1/22* (2006.01)
  *F16H 57/02* (2012.01)
  *F16H 57/038* (2012.01)
  *F16H 57/04* (2010.01)
(52) U.S. Cl.
  CPC ..... *F16H 57/0424* (2013.01); *F16H 57/0436* (2013.01); *F16H 57/046* (2013.01); *F16H 2057/02008* (2013.01); *F16H 2057/02034* (2013.01); *F16H 2057/02052* (2013.01)
(58) Field of Classification Search
  CPC ............... F16H 57/038; F16H 57/0424; F16H 57/0436; F16H 57/046; F16H 57/0441; F16H 2057/02008; F16H 2057/02034; F16H 2057/02052; F16H 2057/02043; F16H 2057/02086; F16H 37/041
  See application file for complete search history.

(56) References Cited

U.S. PATENT DOCUMENTS

| | | | | |
|---|---|---|---|---|
| 5,156,576 | A * | 10/1992 | Johnson | F16H 57/02 74/606 R |
| 7,926,612 | B2 * | 4/2011 | Suzuki | F16H 3/093 180/374 |
| 10,385,803 | B2 * | 8/2019 | Demeulenaere | F16C 35/10 |
| 10,690,230 | B2 * | 6/2020 | Teillet | F16D 43/20 |
| 10,938,273 | B2 * | 3/2021 | Verbridge | B60K 6/365 |
| 11,031,842 | B2 * | 6/2021 | Watrin | F16H 1/16 |
| 2004/0129101 | A1 * | 7/2004 | Mineshima | F16H 1/203 74/423 |
| 2011/0039653 | A1 * | 2/2011 | Hasegawa | B60K 17/34 475/231 |
| 2023/0392680 | A1 * | 12/2023 | Saar | F16H 57/031 |

FOREIGN PATENT DOCUMENTS

| | | | | |
|---|---|---|---|---|
| CN | 108944391 A | * | 12/2018 | .......... B60B 35/16 |
| CN | 110657199 A | * | 1/2020 | |
| CN | 111162632 A | * | 5/2020 | |
| CN | 111594605 A | * | 8/2020 | |
| CN | 112344000 A | * | 2/2021 | .......... F16H 1/203 |
| CN | 112360962 A | * | 2/2021 | .............. F16H 1/20 |
| CN | 116733945 A | * | 9/2023 | |
| DE | 102014107900 A1 | * | 12/2014 | ........... F16H 57/021 |
| EP | 3203111 A1 | * | 8/2017 | ......... B60H 1/00428 |
| EP | 3366935 B1 | * | 1/2020 | ............ F02F 7/0053 |
| GB | 2259746 A | * | 3/1993 | .............. F16H 1/20 |
| JP | H02120133 A | | 5/1990 | |
| WO | WO-2019008350 A1 | * | 1/2019 | ............ F03D 13/10 |

* cited by examiner

DRIVING ASSEMBLY AND VEHICLE HAVING SAME

CROSS-REFERENCE TO RELATED APPLICATIONS

This application claims priority to and benefits of Chinese Patent Application Serial No. 202120943256.1, filed with China National Intellectual Property Administration on Apr. 30, 2021, the entire content of which is incorporated herein by reference.

FIELD

The present disclosure relates to the field of vehicle technologies, and more particularly, to a driving assembly and a vehicle having the same.

BACKGROUND

When a vehicle gear transmission is integrated with a motor, the motor as a power device can reduce the running noise and achieve zero emission.

SUMMARY

Embodiments of the present disclosure provide a driving assembly includes a driving motor, a transmission, a power input shaft, a first output shaft, a second output shaft, a first intermediate shaft and a second intermediate shaft. The driving motor includes a housing and a motor shaft. The transmission includes a casing coupled to the housing of the driving motor. The power input shaft is arranged in the casing and coupled to the motor shaft of the driving motor. The first output shaft is arranged on the casing, and power is transmittable between the first output shaft and the power input shaft. The second output shaft is arranged on the casing, and power is transmittable between the second output shaft and the power input shaft. The first intermediate shaft and the second intermediate shaft are arranged on the casing and configured to transmit power sequentially, power is transmittable between the first intermediate shaft and the power input shaft, and the second intermediate shaft is configured to transmit power to the first output shaft and the second output shaft simultaneously.

Embodiments of the present disclosure further provide a vehicle including a driving assembly, a front axle, a rear axle and a propeller shaft. The propeller shaft is coupled to the rear axle, the driving assembly is arranged on the rear axle, and the propeller shaft is coupled between the front axle and the driving assembly. The driving assembly includes a driving motor, a transmission, a power input shaft, a first output shaft, a second output shaft, a first intermediate shaft and a second intermediate shaft. The driving motor includes a housing and a motor shaft. The transmission includes a casing coupled to the housing of the driving motor. The power input shaft is arranged in the casing and coupled to the motor shaft of the driving motor. The first output shaft is arranged on the casing, and power is transmittable between the first output shaft and the power input shaft. The second output shaft is arranged on the casing, and power is transmittable between the second output shaft and the power input shaft. The first intermediate shaft and the second intermediate shaft are arranged on the casing and configured to transmit power sequentially, power is transmittable between the first intermediate shaft and the power input shaft, and the second intermediate shaft is configured to transmit power to the first output shaft and the second output shaft simultaneously.

REFERENCE NUMERALS driving assembly 1;
transmission 100;
casing 10; first sub-casing 101; first cavity 1011; first groove section 1012; second sub-casing 102; second cavity 1021; second groove section 1022; third sub-casing 103; fourth sub-casing 104; cover plate 1042; through hole 1044; first chamber 105; circular bearing mounting groove 106; first circular bearing mounting sub-groove 1061; second circular bearing mounting sub-groove 1063;
power input shaft 20; first intermediate shaft 30; third intermediate shaft 40; second intermediate shaft 50; first output shaft 60; first bearing 601; second bearing 602; second output shaft 70;
first transmission gear 801; second transmission gear 802; third transmission gear 803; fourth transmission gear 804; fifth transmission gear 805; sixth transmission gear 806; seventh transmission gear 807; input gear 808; first output gear 809; second output gear 810;
oil pump 90;
driving motor 2; housing 21; motor shaft 23;
vehicle 200; front wheel 201; rear wheel 202; front axle 203; rear axle 204; propeller shaft 205.

DETAILED DESCRIPTION

Embodiments of the present disclosure are described in detail below, and examples of embodiments are illustrated in accompanying drawings. The following embodiments described with reference to the accompanying drawings are exemplary, only intended to explain the present disclosure, and cannot be construed to limit the present disclosure.

In the related art, the motor has a small output torque, which is difficult to meet the driving requirement.

The present disclosure aims to solve at least one of the technical problems in the related art to a certain extent.

To this end, embodiments of a first aspect of the present disclosure propose a driving assembly, which can reduce the speed of rotation to increase the output torque, thus realizing the feasibility of the combination of the motor and the transmission.

Embodiments of a second aspect of the present disclosure further propose a vehicle.

The driving assembly according to embodiments of the first aspect of the present disclosure includes: a driving motor including a motor shaft; a transmission including a casing coupled to a housing of the driving motor, and a power input shaft arranged in the casing and including a power input end coupled to the motor shaft of the driving motor; a first output shaft arranged on the casing, power being transmitted between the first output shaft and the power input shaft; a second output shaft arranged on the casing, power being transmitted between the second output shaft and the power input shaft; and a plurality of intermediate shafts arranged on the casing and including a first intermediate shaft and a second intermediate shaft sequentially transmitting power, power being transmitted between the first intermediate shaft and the power input shaft, and the second intermediate shaft simultaneously transmitting power to the first output shaft and the second output shaft.

In the driving assembly according to embodiments of the present disclosure, by arranging the power input shaft, the first intermediate shaft, the second intermediate shaft, the first output shaft and the second output shaft on the casing of the transmission, power is transmitted from the driving motor to the power input shaft and through the first intermediate shaft, the second intermediate shaft and the output shaft (the first output shaft and the second output shaft) to greatly reduce the speed of input power by using the plurality of intermediate shafts, so that the transmission can greatly increase the output torque, thus realizing the feasibility of the combination of the transmission and the motor.

In some embodiments, the driving assembly further includes a third intermediate shaft, and the first intermediate shaft transmits the power to the second intermediate shaft through the third intermediate shaft.

In some embodiments, an axis of the power input shaft, an axis of the first intermediate shaft, an axis of the third intermediate shaft, an axis of the second intermediate shaft and an axis of the first output shaft are parallel to each other, and an axis of the second output shaft is orthogonal to the axis of the second intermediate shaft.

In some embodiments, in a vertical direction, the first intermediate shaft is located between the power input shaft and the third intermediate shaft, the second intermediate shaft is located below the third intermediate shaft, and the second intermediate shaft is at a same level as the second output shaft.

In some embodiments, in a horizontal plane, a projection of the first intermediate shaft, a projection of the second intermediate shaft and a projection of the power input shaft are located between a projection of the third intermediate shaft and a projection of the first output shaft, the projection of the first intermediate shaft is located between the projection of the third intermediate shaft and the projection of the second intermediate shaft, and the projection of the second intermediate shaft is located between the projection of the first intermediate shaft and the projection of the power input shaft.

In some embodiments, in a horizontal plane, a projection of the first intermediate shaft, a projection of the second intermediate shaft and a projection of the power input shaft are located between a projection of the third intermediate shaft and a projection of the first output shaft, the projection of the first intermediate shaft is located between the projection of the third intermediate shaft and the projection of the second intermediate shaft, and the projection of the second intermediate shaft is located between the projection of the first intermediate shaft and the projection of the power input shaft.

In some embodiments, the casing includes a first sub-casing, a second sub-casing and a third sub-casing, the third sub-casing is mounted on a side of the second sub-casing, the first sub-casing is mounted on the second sub-casing to enclose a first chamber, an inner wall of the first chamber has an circular bearing mounting groove including an first circular bearing mounting sub-groove and an second circular bearing mounting sub-groove spaced apart from each other, and circular bearing mounting groove includes a first groove section formed on the first sub-casing and a second groove section formed on the second sub-casing. The power input shaft, the first intermediate shaft, the third intermediate shaft and the second intermediate shaft are mounted on the second sub-casing, the first bearing and the second bearing spaced apart from each other along an axial direction of the second output shaft are fitted over the second output shaft, the first bearing is fitted in the first circular bearing mounting sub-groove, and the second bearing is fitted in the second circular bearing mounting sub-groove.

In some embodiments, the casing further includes a fourth sub-casing and a cover plate, the fourth sub-casing is mounted on an outer side of the third sub-casing, the fourth sub-casing has a through hole, the cover plate is mounted on an outer side of the fourth sub-casing to close an outer end of the through hole, the transmission further includes an oil pump arranged in the fourth sub-casing, the casing defines an oil supply port, and the oil pump sprays lubricating oil at a bottom of the casing into the first chamber through the oil supply port.

In some embodiments, a transmission gear set includes: an input gear mounted on the power input shaft, a first transmission gear meshed with the input gear and a second transmission gear meshed with the third intermediate shaft both mounted on the first intermediate shaft, a third transmission gear meshed with the second transmission gear and a fourth transmission gear meshed with the second intermediate shaft both mounted on the third intermediate shaft, a fifth transmission gear meshed with the fourth transmission gear, a sixth transmission gear meshed with the first output shaft and a seventh transmission gear meshed with the second output shaft all mounted on the second intermediate shaft, a first output gear meshed with the sixth transmission gear and mounted on the first output shaft, and a second output gear meshed with the seventh transmission gear and mounted on the second output shaft.

In some embodiments, the seventh transmission gear and the second output gear are bevel gears.

The vehicle according to embodiments the present disclosure includes a driving assembly according to any embodiment of the present disclosure.

In the vehicle according to embodiments of the present disclosure, by adopting the above driving assembly, the output torque can be increased, to meet the power requirement when driving the vehicle.

As illustrated in FIGS. 1 to 6, a driving assembly 1 according to embodiments of the present disclosure includes a transmission 100, a driving motor 2 with a motor shaft 23, a power input shaft 20, a first output shaft 60, a second output shaft 70, a first intermediate shaft 30 and a second intermediate shaft 50.

Figure 3:
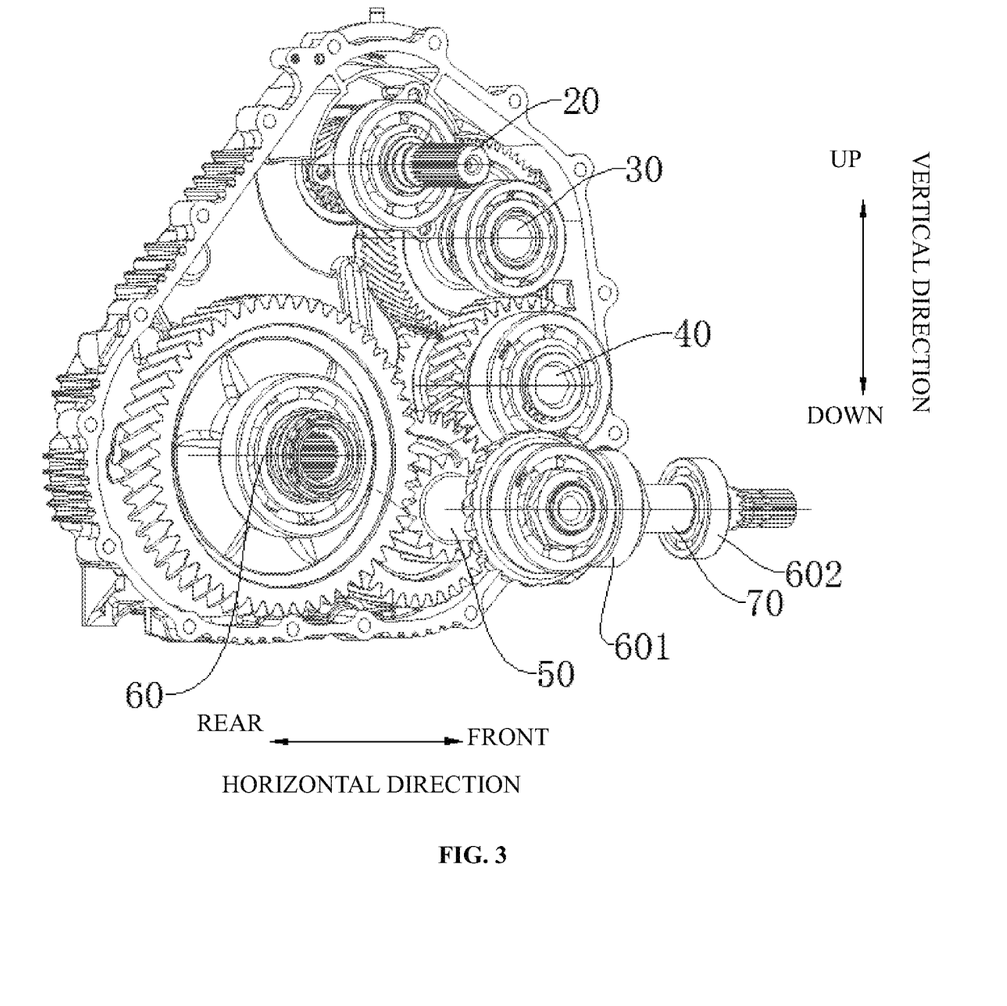
FIG. 3 is a partial assembly view of a transmission of a driving assembly according to an embodiment of the present disclosure.
Figure 5:
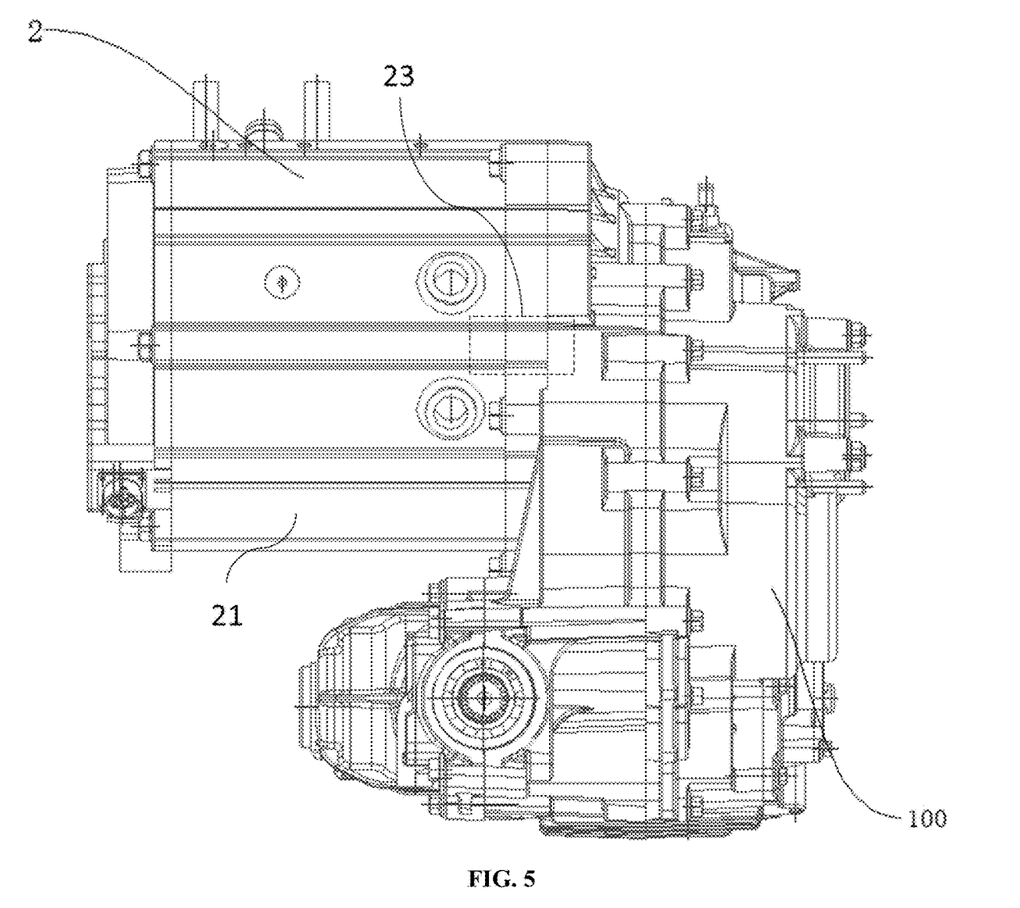
FIG. 5 is an assembly view of a transmission and a motor of a driving assembly according to an embodiment of the present disclosure.

As illustrated in FIG. 3 and FIG. 5, the transmission 100 has a casing 10 coupled to a housing 21 of the driving motor 2. The power input shaft 20, the first intermediate shaft 30, the second intermediate shaft 50, the first output shaft 60 and the second output shaft 70 are all arranged on the casing 10. The power input shaft 20 is coupled to the motor shaft 23 of the driving motor 2 for power input, and the power input by the motor 2 is sequentially transmitted along the power input shaft 20, the first intermediate shaft 30 and the second intermediate shaft 50. The second intermediate shaft 50 simultaneously transmits power to the first output shaft and the second output shaft.

In at least one embodiment, as illustrated in FIG. 3, the power input shaft 20, the first intermediate shaft 30 and the second intermediate shaft 50 are sequentially coupled, and the second intermediate shaft 50 is coupled to both the first output shaft 60 and the second output shaft 70.

The inventor found that when a driving assembly in the related art is driven by an electric power, due to the small driving power and the insufficient transmission capacity of the transmission, the torque output by the transmission is small, which is difficult to support the operation of large equipment, i.e., the feasibility to combine the transmission and the motor for use is low.

In the driving assembly according to embodiments of the present disclosure, by arranging the power input shaft, the first intermediate shaft, the second intermediate shaft, the first output shaft and the second output shaft on the casing of the transmission, the power is transmitted from the driving motor to the power input shaft and through the first intermediate shaft, the second intermediate shaft and the output shaft (the first output shaft and the second output shaft) to greatly reduce the speed of input power by using the plurality of intermediate shafts, so that the transmission can greatly increase the output torque, thus realizing the feasibility of the combination of the transmission and the motor.

Further, the driving assembly 1 further includes a third intermediate shaft 40, and the first intermediate shaft 30 transmits the power to the second intermediate shaft 50 through the third intermediate shaft 40. It can be understood that one or more third intermediate shafts 40 may be provided, and the specific number may be determined according to the deceleration requirement of the transmission 100.

In some embodiments, the power transmission from the power input shaft 20 to the first intermediate shaft 30, the power transmission from the first intermediate shaft 30 to the third intermediate shaft 40, the power transmission from the third intermediate shaft 40 to the second intermediate shaft 50, the power transmission from the second intermediate shaft 50 to the first output shaft 60, and the power transmission from the second intermediate shaft 50 to the second output shaft 70 are all deceleration transmission. Therefore, the speed is reduced step by step between the respective transmission shafts to realize the smooth transition between respective transmission shafts.

It can be understood that the driving assembly 1 of this embodiment is suitable for equipment with a small output torque. For example, when the motor as a power device drives large equipment to operate, the driving assembly 1 of this embodiment can greatly increase the output torque of the motor, thus realizing the electric drive of the large equipment.

In some embodiments, as illustrated in FIG. 3, an axis of the power input shaft 20, an axis of the first intermediate shaft 30, an axis of the third intermediate shaft 40, an axis of the second intermediate shaft 50 and an axis of the first output shaft 60 are parallel to each other, and an axis of the second output shaft 70 is orthogonal to the axis of the second intermediate shaft 50.

Figure 7:
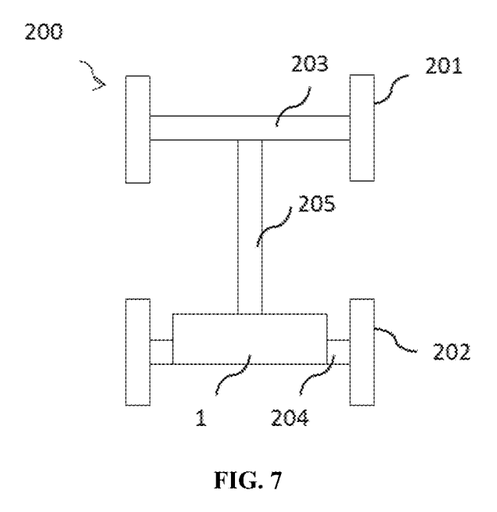
FIG. 7 is a schematic view of a vehicle according to an embodiment of the present disclosure.

As illustrated in FIG. 7, it can be understood that a vehicle 200 usually have two front wheels 201 and two rear wheels 202. The two rear wheels 202 are coupled to a rear axle 204 of the vehicle 200, and the two front wheels 201 are coupled to a front axle 203 of the vehicle 200. Considering the large load-bearing capacity of the rear axle 204, the driving assembly 1 is arranged on the rear axle 204, and a certain distance is defined from the driving assembly 1 to the front axle 203. Thus a propeller shaft 205 coupled to the rear axle 204 needs to be arranged between the driving assembly 1 and the front axle 203, and the propeller shaft 205 is coupled to the second output shaft 70, so that the driving assembly 1 may drive four wheels simultaneously.

In some embodiments, as illustrated in FIG. 3, the first intermediate shaft 30 is located between the power input shaft 20 and the third intermediate shaft 40 in a vertical direction, the first output shaft 60 is lower than the third intermediate shaft 40 in the vertical direction, and the axis of the second intermediate shaft 50 and the axis of the second output shaft 70 are in a same plane in a horizontal direction and lower than the axis of the first output shaft 60.

In at least one embodiment, as illustrated in FIG. 3, the axis of the power input shaft 20 is located obliquely above the axis of the first intermediate shaft 30, the axis of the first intermediate shaft 30 is located obliquely above the axis of the third intermediate shaft 40, the axis of the third intermediate shaft 40 is located obliquely above the axis of the second intermediate shaft 50, and the axis of the first output shaft 60 is located behind the axis of the second intermediate shaft 50. Moreover, the axis of the first output shaft 60 is located between the axis of the third intermediate shaft 40 and the axis of the second intermediate shaft 50 in the vertical direction, and the axis of the second output shaft 70 is located in front of the axis of the second intermediate shaft 50.

Therefore, the power input shaft, the first intermediate shaft, the third intermediate shaft and the second intermediate shaft are arranged in an up-down direction, and the second output shaft and the first output shaft are respectively arranged at a front side and a rear side of the second intermediate shaft, thus improving the utilization rate of the vertical space and reducing the proportion of the transverse space occupied by assembling the transmission.

Figure 4:
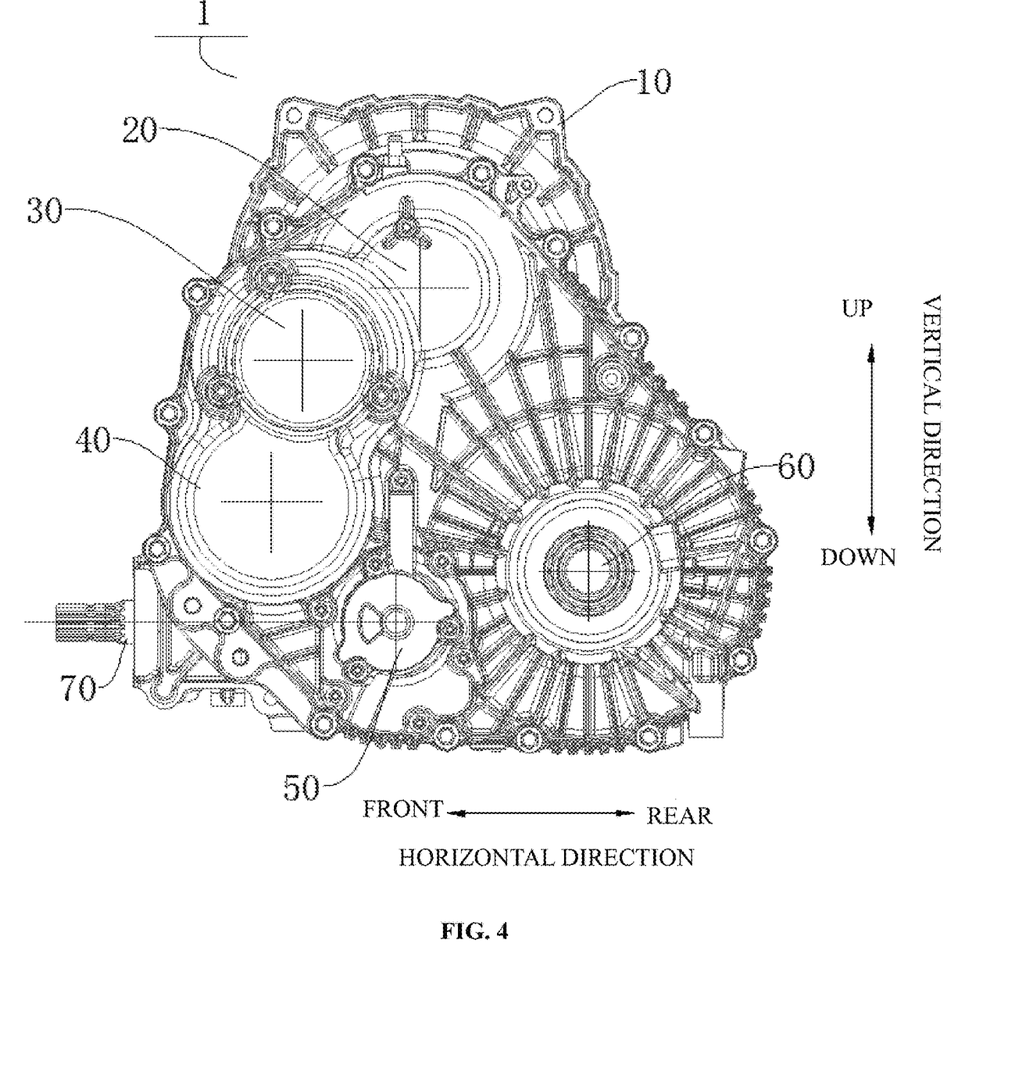
FIG. 4 is a partial side view of a transmission of a driving assembly according to an embodiment of the present disclosure.

Further, as illustrated in FIGS. 3 and 4, in a horizontal plane, a projection of the axis of the first intermediate shaft 30, a projection of the axis of the second intermediate shaft 50 and a projection of the axis of the power input shaft 20 are located between a projection of the axis of the third intermediate shaft 40 and a projection of the axis of the first output shaft 60; the projection of the axis of the first intermediate shaft 30 is located between the projection of the axis of the third intermediate shaft 40 and the projection of the axis of the second intermediate shaft 50; and the projection of the axis of the second intermediate shaft 50 is located between the projection of the axis of the first intermediate shaft 30 and the projection of the axis of the power input shaft 20.

In at least one embodiment, as illustrated in FIGS. 3 and 4, in the horizontal direction, the projection of the axis of the first output shaft 60 is located at a rearmost side, the projection of the axis of the third intermediate shaft 40 is located at a foremost side, and the projection of the axis of the power input shaft 20, the projection of the axis of the first intermediate shaft 30 and the projection of the axis of the second intermediate shaft 50 are located between the projection of the axis of the first output shaft 60 and the projection of the axis of the third intermediate shaft 40; and the projection of the axis of the first intermediate shaft 30 is relatively close to the projection of the axis of the third intermediate shaft 40, the projection of the axis of the power input shaft 20 is relatively close to the projection of the axis of the first output shaft 60, and the projection of the axis of the second intermediate shaft 50 is located between the projection of the axis of the power input shaft 20 and the projection of the axis of the first intermediate shaft 30.

Figure 1:
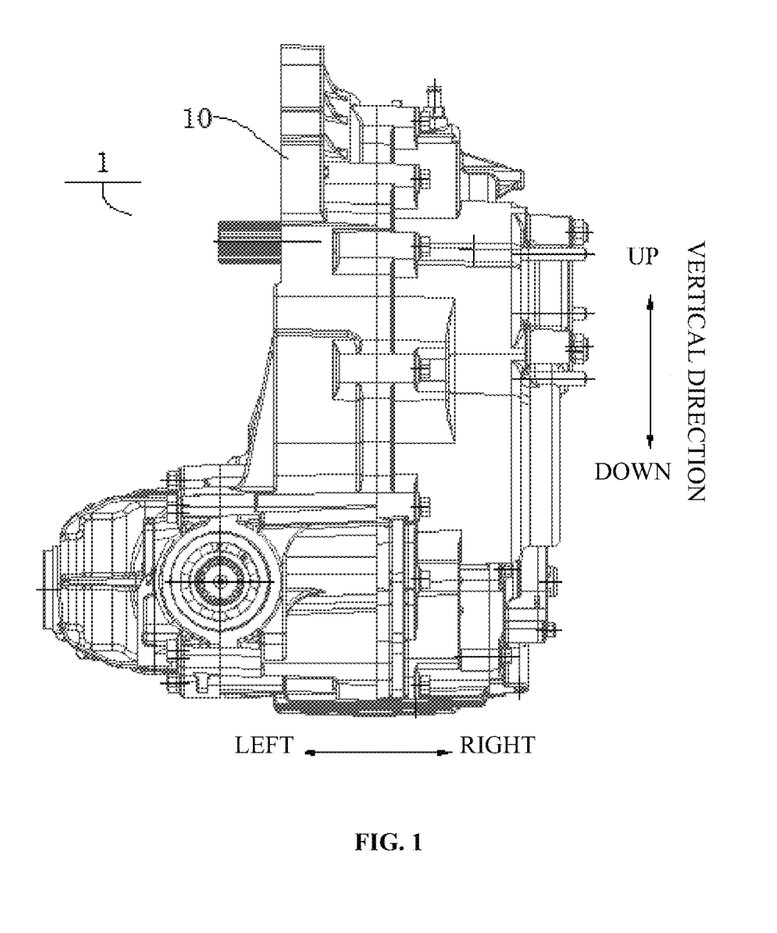
FIG. 1 is a schematic view of a driving assembly according to an embodiment of the present disclosure.
Figure 2:
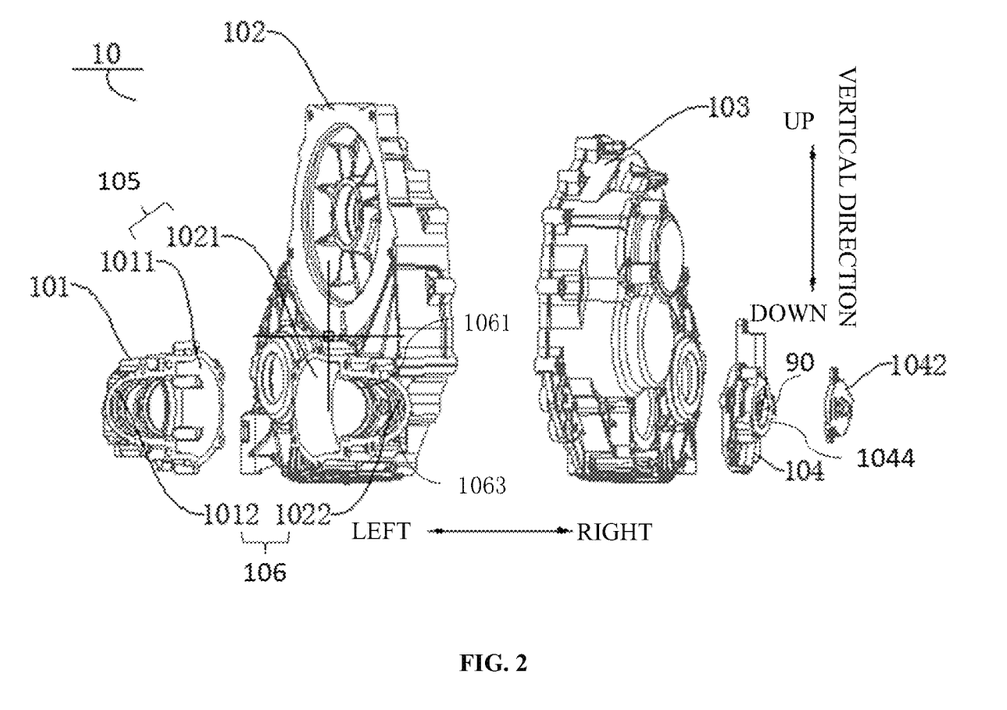
FIG. 2 is an exploded view of a casing of a transmission of a driving assembly according to an embodiment of the present disclosure.

In some embodiments, as illustrated in FIG. 2, the casing 10 includes a first sub-casing 101, a second sub-casing 102 and a third sub-casing 103. The third sub-casing 103 is mounted on a side of the second sub-casing 102, and the first sub-casing 101 is mounted on the second sub-casing 102 to enclose a first chamber 105.

As illustrated in FIG. 2, the first sub-casing 101 is located at a left side of the second sub-casing 102, the third sub-casing 103 is located at a right side of the second sub-casing 102. A left side face of the second sub-casing 102 has a second cavity 1021 open to the left, the first sub-casing 101 has a first cavity 1011 open to the right, and the first sub-casing 101 is coupled to the left side face of the second sub-casing 102 to communicate the first cavity 1011 with the second cavity 1021 to form the first chamber 105.

An inner wall of the first chamber 105 has a circular bearing mounting groove 106, and the circular bearing mounting groove 106 includes a first circular bearing mounting sub-groove 1061 and a second circular bearing mounting sub-groove 1063 spaced apart from each other. In at least one embodiment, the circular bearing mounting groove 106 includes a first groove section 1012 formed in the first sub-casing 101 and a second groove section 1022 formed in the second sub-casing 102.

As illustrated in FIG. 2, when the first sub-casing 101 is coupled to the second sub-casing 102, the first groove section 1012 and the second groove section 1022 are engaged to form the circular bearing mounting groove 106. The second output shaft 70 is fitted in the first chamber 105, the first bearing 601 and the second bearing 602 spaced apart from each other along an axial direction of the second output shaft 70 are fitted over the second output shaft 70, the first bearing 601 is fitted in the first circular bearing mounting sub-groove 1061, and the second bearing 602 is fitted in the second circular bearing mounting sub-groove 1063. Therefore, the fitting of the bearing and the circular bearing mounting groove 106 may have a limit effect on mounting of the first output shaft and prevent the first output shaft from moving radially and axially.

Further, as illustrated in FIG. 2, the casing 10 further includes a fourth sub-casing 104 having a cover plate 1042, the fourth sub-casing 104 is mounted on an outer side of the third sub-casing 103, the fourth sub-casing 104 has a through hole 1044, and the cover plate 1042 is mounted on an outer side of the fourth sub-casing 104 to close an outer end of the through hole 1044. The driving assembly 1 further includes an oil pump 90, the oil pump 90 is arranged in the fourth sub-casing 104, the casing 10 defines an oil supply port, and the oil pump 90 sprays lubricating oil at a bottom of the casing 10 into the first chamber 105 through the oil supply port.

As illustrated in FIG. 2, the fourth sub-casing 104 is coupled to a right side face of the third sub-casing 103. The fourth sub-casing 104 has the through hole 1044 open to the right, the oil pump 90 is assembled in the fourth sub-casing 104 through the through hole 1044, and the cover plate 1042 closes the through hole 1044 to complete the assembly of the oil pump 90. It should be noted that the lubricating oil is stored at the bottom of the casing. In the related art, a wheel is usually used to throw the lubricating oil onto the transmission shaft, while the oil pump 90 in this embodiment may directly spray the lubricating oil at the bottom of the casing 10 onto the respective transmission shafts, thus improving the lubricity of respective transmission shafts.

Figure 6:
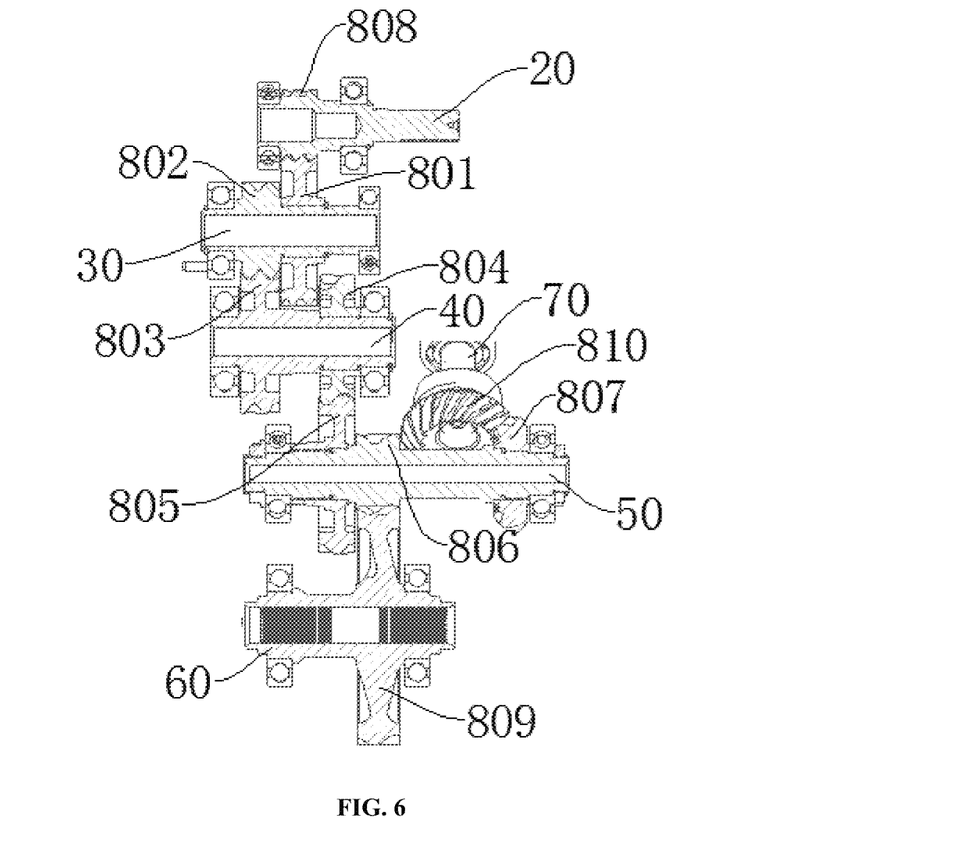
FIG. 6 is a schematic view of a transmission gear set of a transmission of a driving assembly according to an embodiment of the present disclosure.

In some embodiments, as illustrated in FIGS. 3 and 6, the driving assembly 1 further includes a transmission gear set. The transmission gear set includes: an input gear 808 mounted on the power input shaft 20; a first transmission gear 801 meshed with the input gear 808 and a second transmission gear 802 meshed with the third intermediate shaft 40 both mounted on the first intermediate shaft 30; a third transmission gear 803 meshed with the second transmission gear 802 and a fourth transmission gear 804 meshed with the second intermediate shaft 50 both mounted on the third intermediate shaft 40; a fifth transmission gear 805 meshed with the fourth transmission gear 804, a sixth transmission gear 806 meshed with the first output shaft 60 and a seventh transmission gear 807 meshed with the second output shaft all mounted on the second intermediate shaft 50; a first output gear 809 meshed with the sixth transmission gear 806 and mounted on the first output shaft 60, and a second output gear 810 meshed with the seventh transmission gear 807 and mounted on the second output shaft 70.

As illustrated in FIGS. 3 and 6, the input gear 808 is fitted over the power input shaft 20; the first transmission gear 801 and the second transmission gear 802 are fitted over the first intermediate shaft 30; the third transmission gear and the fourth transmission gear 804 are fitted over the third intermediate shaft 40; the fifth transmission gear 805, the sixth transmission gear 806 and the seventh transmission gear 807 are fitted over the second intermediate shaft 50; and the first output gear 809 is fitted over the first output shaft 60. The input gear 808 rotates synchronously with the power input shaft 20, and the power is sequentially transmitted through the input gear 808, the first transmission gear 801, the second transmission gear 802, the third transmission gear 803, the fourth transmission gear 804, the fifth transmission gear 805, the sixth transmission gear 806 and the first output gear 809.

The transmission gear set further includes the second output gear 810 meshed with the seventh transmission gear 807 and mounted on the second output shaft 70. As illustrated in FIGS. 3 and 6, the power is sequentially transmitted through the input gear 808, the first transmission gear 801, the second transmission gear 802, the third transmission gear 803, the fourth transmission gear 804 and the fifth transmission gear 805. The fifth transmission gear 805 drives the second intermediate shaft 50 to rotate, the second intermediate shaft 50 drives the seventh transmission gear 807 to rotate, and the seventh transmission gear 807 drives the second output gear 810 to rotate.

It can be understood that the sixth transmission gear 806 and the seventh transmission gear 807 transmit the power from the second intermediate shaft 50 to the first output shaft 60 and the second output shaft 70 respectively, to drive the first output shaft 60 and the second output shaft 70 simultaneously by the second intermediate shaft 50, and avoid the interference between the second intermediate shaft 50, the first output shaft 60 and the second output shaft 70.

Further, the seventh transmission gear 807 and the third output gear 810 are bevel gears for completing the power transmission between shafts intersecting with each other, i.e., the power transmission between the second output shaft 70 and the second intermediate shaft 50.

A vehicle 200 according to embodiments of the present disclosure includes a driving assembly 1 described in any one of the above embodiments.

In the vehicle 200 according to embodiments of the present disclosure, by adopting the above driving assembly 1, the output torque can be increased, to meet the driving power of the vehicle 200.

The driving assembly 1 according to a specific example of the present disclosure is described below with reference to FIGS. 1 to 6.

As illustrated in FIGS. 1 to 6, the driving assembly 1 according to embodiments of the present disclosure includes a transmission 100, a power input shaft 20, a first intermediate shaft 30, a third intermediate shaft 40, a second intermediate shaft 50, a first output shaft 60, a second output shaft 70, a transmission gear set and a driving motor.

The transmission 100 has a casing 10, and the casing 10 includes a first sub-casing 101, a second sub-casing 102, a third sub-casing 103 and a fourth sub-casing 104. The first sub-casing 101 is coupled to a left side face of the second sub-casing 102. The first sub-casing 101 has a second cavity 1021 open to the right, the left side face of the second sub-casing 102 defines a first cavity 1011 open to the left, and the first cavity 1011 and the second cavity 1021 are in communication with each other, to form a first chamber 105. The third sub-casing 103 is coupled to a right side face of the second sub-casing 102, and the fourth sub-casing 104 is coupled to a right side face of the third sub-casing 103. The fourth sub-casing 104 has a through hole 1044, and an oil pump 90 is assembled in the fourth sub-casing 104 through the through hole 1044. The fourth sub-casing 104 has a cover plate 1042, and the cover plate 1042 is coupled to a right side face of the fourth sub-casing 104. A side wall of the third sub-casing 103 defines an oil supply port, and an oil pump system directly sprays lubricating oil at a bottom of casing 10 to the respective transmission shafts through the oil supply port.

The power input shaft 20, the first intermediate shaft 30, the third intermediate shaft 40, the second intermediate shaft 50 and the first output shaft 60 are mounted on the second sub-casing 102, and the second output shaft 70 is fitted in the first chamber 105. The first chamber 105 has a first circular bearing mounting sub-groove 1061 and a second circular bearing mounting sub-groove 1063, a first bearing 601 and a second bearing 602 are fitted over the second output shaft 70, the first bearing 601 is fitted in the first circular bearing mounting sub-groove 1061, and the second bearing 602 is fitted in the second circular bearing mounting sub-groove 1063.

In a vertical direction, the power input shaft 20 is higher than the first intermediate shaft 30, the first intermediate shaft 30 is higher than the third intermediate shaft 40, and the third intermediate shaft 40 is higher than the second intermediate shaft 50; an axis of the first output shaft 60 is located between an axis of the third intermediate shaft 40 and an axis of the second intermediate shaft 50, an axis of the second output shaft 70 and the axis of the second intermediate shaft 50 are located in a same horizontal plane; an axis of the power input shaft 20, an axis of the first intermediate shaft 30, the axis of the third intermediate shaft 40, the axis of the second intermediate shaft 50 and the axis of the first output shaft 60 are parallel to each other, and the axis of the second output shaft 70 is orthogonal to the axis of the second intermediate shaft 50.

In a horizontal plane, a projection of the axis of the third intermediate shaft 40 is located in front of a projection of the axis of the first intermediate shaft 30, the projection of the axis of the first intermediate shaft 30 is located in front of a projection of the axis of the second intermediate shaft 50, the projection of the axis of the second intermediate shaft 50 is located in front of a projection of the axis of the power input shaft 20, and the projection of the axis of the power input shaft 20 is located in front of a projection of the axis of the first output shaft 60.

The transmission gear set includes an input gear 808, a first transmission gear 801, a second transmission gear 802, a third transmission gear 803, a fourth transmission gear 804, a fifth transmission gear 805, a sixth transmission gear 806, a seventh transmission gear 807, a first output gear 809 and a second output gear 810. The input gear 808 is fitted over the power input shaft 20, the first transmission gear 801 and the second transmission gear 802 are fitted over the first intermediate shaft 30, and the input gear 808 is meshed with the first transmission gear 801. The third transmission gear 803 and the fourth transmission gear 804 are fitted over the third intermediate shaft 40, and the third transmission gear 803 is meshed with the second transmission gear 802. The fifth transmission gear 805, the sixth transmission gear 806 and the seventh transmission gear 807 are all fitted over the second intermediate shaft 50 and spaced apart from each other in an axial direction of the second intermediate shaft 50, and the fifth transmission gear 805 is meshed with the fourth transmission gear 804. The first output gear 809 is fitted over the first output shaft 60 and meshed with the sixth transmission gear 806. The second output gear 810 is fitted over the second output shaft 70 and meshed with the seventh transmission gear 807.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation as then described or as illustrated in the drawings under discussion. These relative terms are only for convenience of description and do not indicate or imply that the device or element referred to must have a particular orientation, or be constructed and operated in a particular orientation. Thus, these terms shall not be construed as limitation on the present disclosure.

In addition, terms such as "first" and "second" are merely used for descriptive purposes and cannot be understood as indicating or implying relative importance or the number of technical features indicated. Thus, the features defined with "first" and "second" may explicitly or implicitly include at least one of the features. In the description of the present disclosure, unless otherwise specifically defined, "a plurality of" means at least two, such as two, three, etc.

In the present disclosure, unless otherwise explicitly specified and defined, the terms "mounted," "coupled," "connected," "fixed" and the like are understood broadly, and may be, for example, fixed connections, detachable connections, or integral connections; may also be mechanical or electrical connections or intercommunication; may also be direct connections or indirect connections via intervening media; may also be inner communications or interactions of two elements. For those skilled in the art, the specific meaning of the above terms in the present disclosure can be understood according to specific situations, unless otherwise explicitly specified.

In the present disclosure, unless otherwise explicitly specified and defined, a structure in which a first feature is "on" or "below" a second feature may include an embodiment in which the first feature is in direct contact with the second feature, and may also include an embodiment in which the first feature is in indirect contact with the second feature via an intermediate medium. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although embodiments of the present disclosure have been illustrated and described above, it can be understood that the above embodiments are exemplary and shall not be understood as limitation to the present disclosure, and changes, modifications, alternatives and variations can be made in the above embodiments within the scope of the present disclosure by those skilled in the art.

What is claimed is:

1. A driving assembly, comprising:
   a driving motor comprising a housing and a motor shaft;
   a transmission comprising a casing coupled to the housing of the driving motor;
   a power input shaft arranged in the casing and coupled to the motor shaft of the driving motor;
   a first output shaft arranged on the casing, power being transmittable between the first output shaft and the power input shaft;
   a second output shaft arranged on the casing, power being transmittable between the second output shaft and the power input shaft; and
   a first intermediate shaft and a second intermediate shaft arranged on the casing and configured to transmit power sequentially, power being transmittable between the first intermediate shaft and the power input shaft, and the second intermediate shaft being configured to transmit power to the first output shaft and the second output shaft simultaneously,
   wherein the casing comprises a first sub-casing, a second sub-casing and a third sub-casing, the third sub-casing is mounted on a side of the second sub-casing, the first sub-casing is mounted on the second sub-casing to enclose a first chamber, an inner wall of the first chamber has a circular bearing mounting groove comprising a first circular bearing mounting sub-groove and a second circular bearing mounting sub-groove spaced apart from each other, a first bearing and a second bearing are spaced apart from each other along an axial direction of the second output shaft and fitted over the second output shaft, the first bearing is fitted in the first circular bearing mounting sub-groove, and the second bearing is fitted in the second circular bearing mounting sub-groove.

2. The driving assembly according to claim 1, further comprising a third intermediate shaft arranged on the casing, the first intermediate shaft is configured to transmit power to the second intermediate shaft through the third intermediate shaft.

3. The driving assembly according to claim 2, wherein power transmission from the power
   input shaft to the first intermediate shaft, power transmission from the first intermediate shaft to the third intermediate shaft, power transmission from the third intermediate shaft to the second intermediate shaft, power transmission from the second intermediate shaft to the first output shaft, and power transmission from the second intermediate shaft to the second output shaft are all deceleration transmission.

4. The driving assembly according to claim 2, wherein an axis of the power input shaft, an axis of the first intermediate shaft, an axis of the third intermediate shaft, an axis of the second intermediate shaft and an axis of the first output shaft are parallel to each other, and an axis of the second output shaft is orthogonal to the axis of the second intermediate shaft.

5. The driving assembly according to claim 4, wherein in a vertical direction, the first intermediate shaft is located between the power input shaft and the third intermediate shaft, the second intermediate shaft is located below the third intermediate shaft, and the axis of the second intermediate shaft and the axis of the second output shaft are located in a same plane in a horizontal direction and lower than the axis of the first output shaft.

6. The driving assembly according to claim 5, wherein the first output shaft is lower than the third intermediate shaft in the vertical direction.

7. The driving assembly according to claim 6, wherein the axis of the power input shaft is located obliquely above the axis of the first intermediate shaft, the axis of the first intermediate shaft is located obliquely above the axis of the third intermediate shaft, the axis of the third intermediate shaft is located obliquely above the axis of the second intermediate shaft, and the axis of the first output shaft is located behind the axis of the second intermediate shaft;
   the axis of the first output shaft is located between the axis of the third intermediate shaft and the axis of the second intermediate shaft in the vertical direction, and the axis of the second output shaft is located in front of the axis of the second intermediate shaft.

8. The driving assembly according to claim 4, wherein in a horizontal plane, a projection of the axis of the first intermediate shaft, a projection of the axis of the second intermediate shaft and a projection of the axis of the power input shaft are located between a projection of the axis of the third intermediate shaft and a projection of the axis of the first output shaft, the projection of the axis of the first intermediate shaft is located between the projection of the axis of the third intermediate shaft and the projection of the axis of the second intermediate shaft, and the projection of the axis of the second intermediate shaft is located between the projection of the axis of the first intermediate shaft and the projection of the axis of the power input shaft.

9. The driving assembly according to claim 8, wherein in a horizontal direction, the projection of the axis of the first output shaft is located at a rearmost side, the projection of the axis of the third intermediate shaft is located at a foremost side, and the projection of the axis of the power input shaft, the projection of the axis of the first intermediate shaft and the projection of the axis of the second intermediate shaft are located between the projection of the axis of the first output shaft and the projection of the axis of the third intermediate shaft; and the projection of the axis of the first intermediate shaft is relatively close to the projection of the axis of the third intermediate shaft, the projection of the axis of the power input shaft is relatively close to the projection of the axis of the first output shaft, and the projection of the axis of the second intermediate shaft is located between the projection of the axis of the power input shaft and the projection of the axis of the first intermediate shaft.

10. The driving assembly according to claim 1, wherein the first sub-casing is located at a left side of the second sub-casing, the third sub-casing is located at a right side of the second sub-casing, a left side face of the second sub-casing has a first cavity open to the left, the first sub-casing has a second cavity open to the right, and the first sub-casing is coupled to the left side face of the second sub-casing to communicate the first cavity with the second cavity to form the first chamber.

11. The driving assembly according to claim 1, wherein the circular bearing mounting groove includes a first groove section formed in the first sub-casing and a second groove section formed in the second sub-casing, and when the first sub-casing is coupled to the second sub-casing, the first groove section and the second groove section are engaged to form the circular bearing mounting groove.

12. The driving assembly according to claim 1, wherein the casing further comprises a fourth sub-casing, the transmission further comprises an oil pump arranged in the fourth sub-casing, the casing defines an oil supply port, and the oil pump is configured to spray lubricating oil at a bottom of the casing into the first chamber through the oil supply port.

13. The driving assembly according to claim 12, wherein the fourth sub-casing has a cover plate, the fourth sub-casing is mounted on an outer side of the third sub-casing, the fourth sub-casing has a through hole, and the cover plate is mounted on an outer side of the fourth sub-casing to close an outer end of the through hole.

14. The driving assembly according to claim 13, wherein the fourth sub-casing is coupled to a right side face of the third sub-casing, the fourth sub-casing has the through hole open to the right, the oil pump is assembled in the fourth sub-casing through the through hole, and the cover plate closes the through hole.

15. The driving assembly according to claim 2, further comprising a transmission gear set, the transmission gear set comprising: an input gear mounted on the power input shaft; a first transmission gear meshed with the input gear and a second transmission gear meshed with the third intermediate shaft both mounted on the first intermediate shaft; a third transmission gear meshed with the second transmission gear and a fourth transmission gear meshed with the second intermediate shaft both mounted on the third intermediate shaft; a fifth transmission gear meshed with the fourth transmission gear, a sixth transmission gear meshed with the first output shaft and a seventh transmission gear meshed with the second output shaft all mounted on the second intermediate shaft; a first output gear meshed with the sixth transmission gear and mounted on the first output shaft; and a second output gear meshed with the seventh transmission gear and mounted on the second output shaft.

16. The driving assembly according to claim 15, wherein the seventh transmission gear and the second output gear are bevel gears.

17. A vehicle, comprising:
a driving assembly, comprising:
a driving motor comprising a housing and a motor shaft,
a transmission comprising a casing coupled to the housing of the driving motor,
a power input shaft arranged in the casing and comprising a power input end coupled to the motor shaft of the driving motor,
a first output shaft arranged on the casing, power being transmittable between the first output shaft and the power input shaft,
a second output shaft arranged on the casing, power being transmittable between the second output shaft and the power input shaft, and
a first intermediate shaft and a second intermediate shaft arranged on the casing and configured to transmit power sequentially, power being transmittable between the first intermediate shaft and the power input shaft, and the second intermediate shaft being configured to transmit power to the first output shaft and the second output shaft simultaneously,
a front axle;
a rear axle; and
a propeller shaft coupled the rear axle,
wherein the driving assembly is arranged on the rear axle, and the propeller shaft is coupled between the front axle and the driving assembly,
wherein the casing comprises a first sub-casing, a second sub-casing and a third sub-casing, the third sub-casing is mounted on a side of the second sub-casing, the first sub-casing is mounted on the second sub-casing to enclose a first chamber, an inner wall of the first chamber has a circular bearing mounting groove comprising a first circular bearing mounting sub-groove and a second circular bearing mounting sub-groove spaced apart from each other, a first bearing and a second bearing are spaced apart from each other along an axial direction of the second output shaft and fitted over the second output shaft, the first bearing is fitted in the first circular bearing mounting sub-groove, and the second bearing is fitted in the second circular bearing mounting sub-groove.

18. The vehicle according to claim 17, further comprising a third intermediate shaft arranged on the casing, the first intermediate shaft is configured to transmit power to the second intermediate shaft through the third intermediate shaft.

19. The vehicle according to claim 18, wherein power transmission from the power input shaft to the first intermediate shaft, power transmission from the first intermediate shaft to the third intermediate shaft, power transmission from the third intermediate shaft to the second intermediate shaft, power transmission from the second intermediate shaft to the first output shaft, and power transmission from the second intermediate shaft to the second output shaft are all deceleration transmission.

\* \* \* \* \*